(12) United States Patent
Tan et al.

(10) Patent No.: US 11,629,747 B2
(45) Date of Patent: Apr. 18, 2023

(54) CAPTIVE SCREW

(71) Applicant: Hewlett Packard Enterprise Development LP, Houston, TX (US)

(72) Inventors: Chong Tan, Spring, TX (US); Joseph Allen, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 339 days.

(21) Appl. No.: 16/774,504

(22) Filed: Jan. 28, 2020

(65) Prior Publication Data
US 2021/0231162 A1 Jul. 29, 2021

(51) Int. Cl.
| F16B 21/18 | (2006.01) |
|---|---|
| F16B 41/00 | (2006.01) |
| F16B 5/02 | (2006.01) |
| F16B 37/04 | (2006.01) |
| F16B 35/04 | (2006.01) |

(52) U.S. Cl.
CPC .......... *F16B 41/002* (2013.01); *F16B 5/0208* (2013.01); *F16B 35/04* (2013.01); *F16B 37/04* (2013.01)

(58) Field of Classification Search
CPC ...... F16B 41/002; F16B 37/068; F16B 35/04; F16B 37/04
USPC ................................. 411/352, 549
See application file for complete search history.

(56) References Cited

U.S. PATENT DOCUMENTS

| 3,209,806 | A | | 10/1965 | Currier et al. |
|---|---|---|---|---|
| 3,564,563 | A | * | 2/1971 | Trotter ...................... F16B 5/10 411/926 |
| 4,621,961 | A | | 11/1986 | Gulistan |
| 5,338,139 | A | * | 8/1994 | Swanstrom ........... F16B 41/002 411/910 |
| 5,382,124 | A | * | 1/1995 | Frattarola ............. F16B 5/0208 411/352 |
| 6,079,923 | A | * | 6/2000 | Ross ..................... F16B 37/145 411/7 |
| 6,871,431 | B2 | | 3/2005 | Schmidt |
| 7,686,553 | B2 | * | 3/2010 | Durfee, Jr. .............. F16B 21/18 403/14 |
| 8,066,461 | B2 | * | 11/2011 | Travers ................. F16B 5/0208 411/413 |
| 8,087,861 | B2 | * | 1/2012 | Wang .................... F16B 41/002 411/107 |
| 8,905,692 | B2 | | 12/2014 | Limpert |
| 9,206,834 | B2 | * | 12/2015 | Tseng .................... F16B 5/0208 |

(Continued)

OTHER PUBLICATIONS

Fivetech Technology, Inc., "12 SERIES-Wing Knob (Medium)," copyright 2018; retrieved online Mar. 29, 2019, http://www.fivetk.com/products_overview_detail_page/index.php?id=215&m_id=49&s_id=109.

(Continued)

*Primary Examiner* — Gary W Estremsky
(74) *Attorney, Agent, or Firm* — Hewlett Packard Enterprise Patent Department

(57) ABSTRACT

A captive screw, comprising: a screw; a press fit nut, to connect to an opening on a device and to accept a screw, including: a bottom portion, to extend through the opening; a top portion; and a middle portion, wherein the middle portion is smaller in circumference than the top portion and the bottom portion; and a sleeve including a protrusion, wherein the sleeve fits over the screw and attaches to the press fit nut via the protrusion.

20 Claims, 7 Drawing Sheets

(56) References Cited

U.S. PATENT DOCUMENTS

| | | | | |
|---|---|---|---|---|
| 10,756,451 | B2* | 8/2020 | Wagner | H01R 4/34 |
| 2011/0187247 | A1* | 8/2011 | Carter | A47B 46/00 |
| | | | | 312/246 |
| 2011/0308065 | A1* | 12/2011 | Wang | F16B 5/0208 |
| | | | | 29/527.2 |
| 2012/0224935 | A1* | 9/2012 | Chiu | F16B 5/0208 |
| | | | | 411/352 |
| 2014/0119850 | A1* | 5/2014 | Bentrim | F16B 29/00 |
| | | | | 411/22 |

OTHER PUBLICATIONS

Machinedesign.com, "Knob-Style Captive Fastener Provides Tool-Free Access," Aug. 9, 2016, https://www.machinedesign.com/fasteners/knob-style-captive-fastener-provides-tool-free-access.

* cited by examiner

CAPTIVE SCREW

BACKGROUND

Captive screws may utilize a spring to eject or force a screw up from a nut, when the screw is loosened from a tightened position. A computing device may utilize numerous captive screws, thus increasing the overall cost of the computing device. Costs may be decreased if a new design is utilized.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
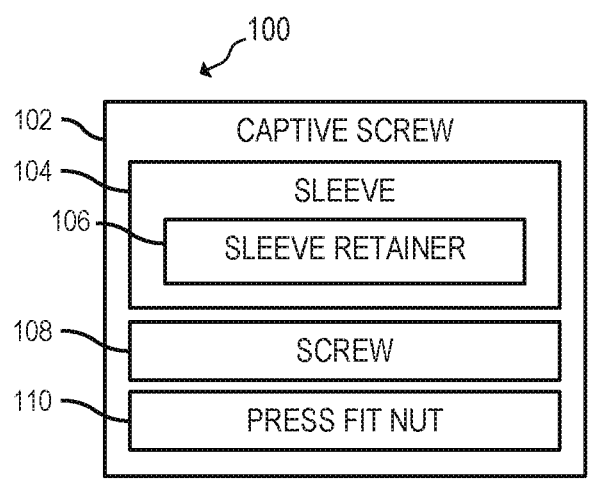
FIG. 1 is a block diagram of a captive screw, according to an example.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Captive screws may utilize a spring to eject or force a screw up from a nut, when the screw is loosened from a tightened position. A computing device may utilize numerous captive screws, thus increasing the overall cost of the computing device. Costs may be decreased if a new design is utilized. For example, a captive screw may utilize various metal parts, springs, custom screws, and/or other components which may increase the cost of the custom screw. Further, the captive screw may be used throughout a computing device, such as a server. When many servers are manufactured, costs may increase exponentially, based on various components (such as storage, memory, processors, metal, PCB, etc.). It is a benefit to decrease cost wherever possible.

Based on these issues described above, an area to decrease costs may be captive screws. While generally captive screws are low cost components, a reduction of cost may further lower the total cost of a computing device, as well as reduce the amount of materials used for the computing device. In such examples, a captive screw may utilize a screw (for example, an "off the shelf" screw of a standard size and measurement) or a custom screw. The captive screw may utilize a sleeve. The sleeve may fit over the screw, thus holding the screw in place when attached or connected to a press fit nut. Further, the sleeve may attach to or snap onto the press fit nut. The press fit nut may snap into or attach to an aperture on a device. The press fit nut may also accept the screw. Further still, the sleeve, in conjunction with the press fit nut, may ensure that the bottom tip of the screw (as in, the end of the screw with threads) sits flush, when loose or not screwed into the press fit nut, against an aperture of the press fit nut (as in, the opening to accept the screw). In some examples, if the screw were to move in any direction, the screw may not fit properly into the press fit nut or could become cross threaded with the press fit nut. Thus, the amount of components for a captive screw may be reduced and, based on components and materials used, the cost of the captive screw may be reduced.

Examples described herein, include a captive screw. The captive screw may include a screw. The screw may be a standard or "off the shelf" screw. The screw may be a custom screw. The screw may be a thumbscrew. The screw may include a head. The head may include slots to allow for a tool to turn the screw. The screw may include a shank or, in other words, a smooth or unthreaded portion. The screw may include threads. In another example, the screw may be a self-tapping screw.

The captive screw may include a press fit nut. The press fit nut may accept the screw. The press fit nut may be an unthreaded nut. In such an example, the action of tightening a screw in an unthreaded press fit nut may create threads inside the press fit nut. The press fit nut may insert into, fit into, attach to, or snap into an aperture on a device or computing device. In such examples, the press fit nut, may include a notch along the circumference of the press fit nut. In such examples, the aperture on a device or computing device may include a protrusion along the bottom edge of the aperture. The protrusion may fit into the notch. In an example, the protrusion may be similar to a washer. In another example, the protrusion may be an integrated washer. In such examples, the press fit nut may be sufficiently flexible to allow for insertion into the aperture and for the protrusion to fit into the notch.

The captive screw may include a sleeve. The sleeve, as noted above, may attach to or snap onto a press fit nut. In an example, the sleeve may include a sleeve retainer. In an example, the sleeve retainer may be a protrusion, hook, or an L-shape section formed along the bottom edge of the sleeve. The protrusion, hook, or L-shape section may fit into a notch along the circumference of the press fit nut. The notch may be located above and adjacent to where the press fit nut sits flush with the device or computing device. The sleeve may fit over the screw, thus retaining the screw and ensuring the bottom tip of the screw (as in, the end of the screw with threads) sits flush, when loose or not screwed into the press fit nut, against an aperture of the press fit nut (as in, the opening to accept the screw). In such an example, the sleeve may prevent the screw from cross threading with the press fit nut.

FIG. 1 is a block diagram 100 of a captive screw, according to an example. Captive screw 102 may include a sleeve 104. The sleeve 104 may include a sleeve retainer 106. The sleeve retainer 106 may attach to or fit over a press fit nut 110. The captive screw 102 may include a screw 108. The sleeve 104 may retain the screw 108. The captive screw 102 may include the press fit nut 110. The press fit nut 110 may accept the screw 108. In other words, the press fit nut 110 may include an aperture (threaded or unthreaded) to accept the screw 108. The press fit nut 110 may insert into, fit into, attach to, or snap into an aperture on a device, computing device.

As used herein, a "computing device" may be a storage array, storage device, storage enclosure, server, blade server, desktop or laptop computer, computer cluster, node, partition, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "device" may be any PCIe card, option card, network interface card, motherboard, printed circuit board (PCB), mezzanine card, other optional component, other add-in component, or a combination thereof. For example, the device may be an add-in component that may be attached to a motherboard via the captive screw described throughout.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, "printed circuit board" or PCB may refer to a board that mechanically supports and electrically connects components. The board may connect components via tracks, pads, tracing, vias, layers, etching, soldering, and/or various other means.

As used herein, "option card" may refer to a card that is an option or add-on for a computing device. In other words, an option card may include, but not be limited to, an add-in component, a peripheral component, a controller, a PCIe card, a NIC, or a machine-readable storage medium. An option card may be hot pluggable, hot swappable, or neither.

In FIG. 1, the captive screw 102 may include a screw 108. In an example, the screw 108 may be a standard or "off the shelf" screw. In another example, the screw 108 may be a custom made screw. In another example, the screw 108 may be a thumbscrew. In another example, the screw 108 may be a self-tapping screw. In another example, the screw 108 may be comprised of metal or plastic. In another example, the screw 108 may include a head, a shank (or smooth or unthreaded portion), and/or threads.

In FIG. 1, the captive screw 102 may include a sleeve 104. In an example, the sleeve 104 may be comprised of metal, plastic, some other suitable material, or some combination thereof. In an example, portions or all of the sleeve 104 may be flexible. In a further example, the sleeve retainer 106 may be flexible. In such examples, the sleeve retainer 106 may flex outwards while being pressed onto or attached to the press fit nut 110. After the sleeve retainer 106 is fully pressed onto or attached to the press fit nut 110, then the sleeve retainer 106 may flex back into the sleeve retainers 106 original position.

As noted, the sleeve 104 may retain the screw 108. In other words, once the sleeve 104 is attached to or connected to the press fit nut 110, the screw 108 may be held in place, while still allowing the screw to be loosened or tightened (depending on the original starting position of the screw 108). In such examples, the sleeve 104 may fit over the screw 108. In a further example, the top of the sleeve 104 may allow for access to the screw 108, while preventing the screw 108 to be removed from the sleeve 104. Further, the top of the sleeve 104 may allow for a screwdriver or other tool to access the screw 108, to either tighten or loosen the screw 108. In another example, while the screw 108 is in a loosened state, the sleeve 104 may retain the screw 108 in a position over the press fit nut 110. In such examples, the position that the screw 108 is retained in may prevent the screw 108 from misaligning or cross threading with the aperture (which accepts the screw 108) of the press fit nut 110.

Figure 5:
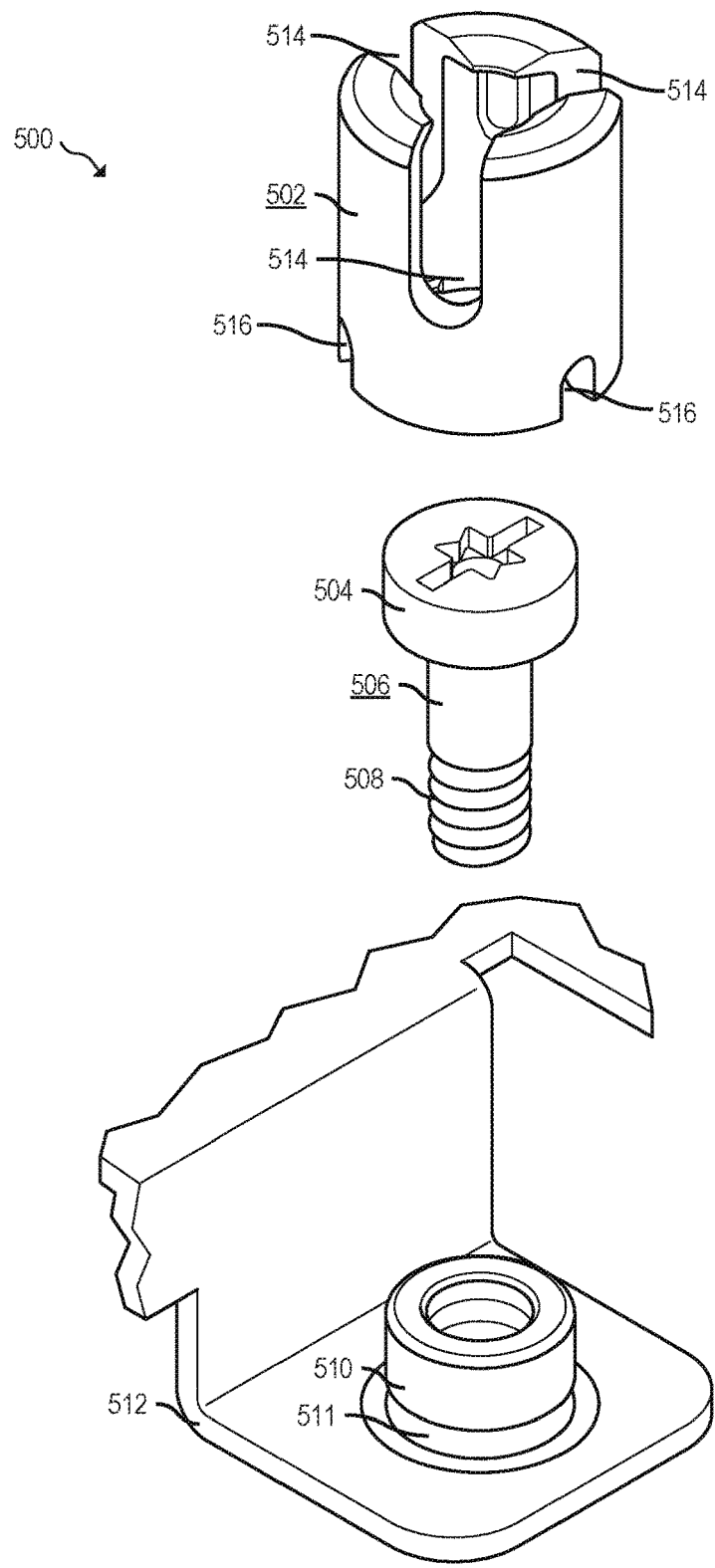
FIG. 5 is a schematic exploded view of another captive screw, according to an example.

As noted, the captive screw 102 may include the press fit nut 110. As noted the press fit nut 110 may fit into, attach to, or snap into an aperture on a device or computing device. In an example, the aperture on a device or computing device may include a lip, edge, or protrusion (as shown in FIG. 5). The press fit nut 110 may include a notch that aligns with the lip, edge, or protrusion. Thus, when the press fit nut 110 is snapped into, fitted to, or snapped into the aperture, the notch may align with lip, edge, or protrusion (in other words, the lip, edge, or protrusion may fit into the notch). In another example, the portion of the press fit nut 110 above the notch may extend further out than the rest of the press fit nut 110. In a further example, the portion of the press fit nut 110 above the notch may be an integrated washer or similar to a washer in shape. The extended portion may prevent the press fit nut 110 from being pushed fully through the aperture.

Figure 2:
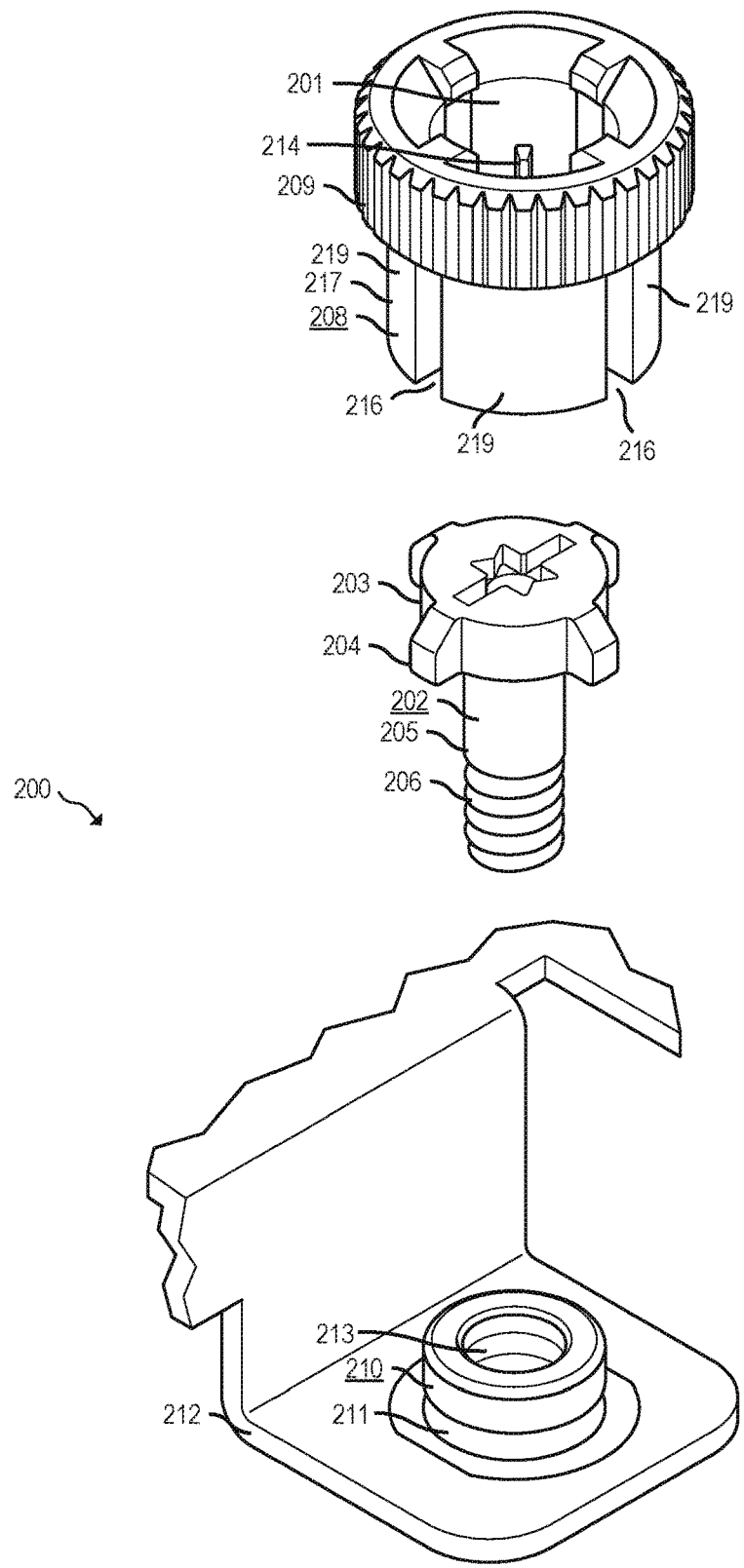
FIG. 2 is a schematic exploded view of a captive screw, according to an example.

FIG. 2 is a schematic exploded view of a captive screw, according to an example. In an example, the captive screw 200 may include a sleeve 208. The sleeve 208 may fit over a custom screw 202. The sleeve 208 may attach to, snap onto, or connect to a press fit nut 210. When the sleeve 208 is attached to the press fit nut 210, the sleeve 208 may retain the custom screw 202 in a position over the opening or aperture 213 of the press fit nut 210.

As noted, the captive screw 200 may include a sleeve 208. In an example, the sleeve 208 may include a knurled section 209. In an example, the knurled section 209 may allow for the captive screw 200 to function as a thumbscrew. In such examples, the sleeve 208, in conjunction with the thumb-screw features 204 (or wings, protrusions, extensions, etc.) on the custom screw 202, may allow the captive screw 200 to act as a thumbscrew. For example, as the sleeve 208 is rotated or turned, the thumbscrew features 204 (or wings, protrusions, extensions, etc.) on the custom screw 202 may catch on friction ribs 214 located on the inside of the sleeve 208. In other words, as the sleeve 208 is rotated or turned, the custom screw 202 may tighten in the aperture 213 of the press fit nut 210.

In another example, the sleeve 208 may include an opening or aperture 201 to allow for access to the top or head 203 of the custom screw 202. In such examples, the aperture 201 may allow for a screwdriver or other appropriate to tool to tighten the custom screw 202. In another example, the bottom portion 217 or portions of the sleeve 208 may be comprised of sections 219 or tabs. In such examples, the sections 219 or tabs may allow the sleeve 208 to flex outwards when pushing the sleeve 208 onto the press fit nut 210. In such examples, each section 219 or tab may be separated by a gap 216.

In another example, the press fit nut 210 may include an indentation 211 or notch. In such examples, the sleeve retainer of the sleeve 208 may fit into the indentation 211 or notch, when the sleeve 208 is pushed onto the press fit nut 210. In another example, the press fit nut 210 may snap into, fit into, or attach to an aperture of a device 212. Further, the press fit nut 210 may align with an aperture on a PCB, other device, or some portion of a computing device. In such examples, as the custom screw 202 or screw is tightened, the custom screw 202 or screw may protrude through the press fit nut and thread into the aperture of the device 212, PCB, other device, or some portion of the computing device.

In another example, the captive screw 200 may include a custom screw 202. The custom screw 202 may include a head 203. The head 203 may include slots to accept a tool to tighten or loosen the custom screw 202. In another example, the head 203 may include thumbscrew features 204, wings, protrusions, or extensions. As noted above, when the thumbscrew features 204 are used in conjunction with the knurled section 209 of the sleeve 208, the captive screw 200 may act as a thumbscrew. In another example, the custom screw 202 may include a shank 205 (or smooth/unthreaded portion) and a threaded portion 206.

Figure 3:
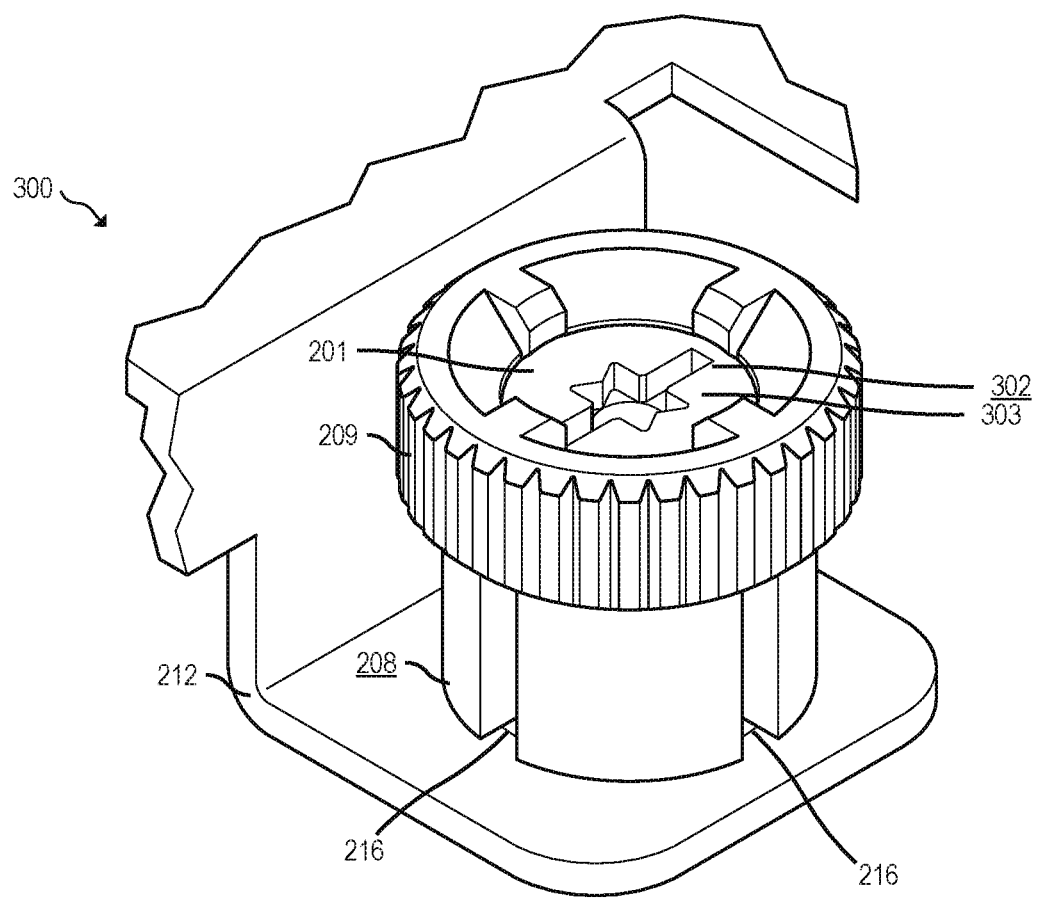
FIG. 3 is a schematic view of the captive screw, according to an example.

FIG. 3 is a schematic view of an assembled captive screw, according to an example. In an example, the screw 302, in a loosened position, may align with the aperture of the press fit nut. Further, the screw 302 may not be loose within the sleeve 208. In other words, the sleeve 208 may offer sufficient friction or a small amount of space to prevent the screw 302 from tilting in any direction. Thus, the screw 302 may be prevented from cross threading with press fit nut. In other words, the screw 302 may not be tightened in such a way as to prevent the screw 302 from fully tightening into or altering the threading of the press fit nut.

In another example, the screw 302 may be tightened via a screwdriver or other tool through the opening or aperture 201 of the sleeve 208. In another example, the sleeve 208, in conjunction with a custom screw (as shown in FIG. 2) may act as a thumbscrew. For example, the knurled section 209 of the sleeve 208 may be turned or rotated clockwise to tighten the screw 302 or counter-clockwise to loosen the screw 302. In another example, the screw 302 may be a self-tapping screw. As noted above, the captive screw 300 may connect a device 212 to another device, PCB, or some portion of a computing device.

In another example, the sleeve 208 may be comprised of plastic, metal or some other suitable material. In another example, the screw 302 may be comprised of metal or plastic. In another example, the press fit nut may be comprised of metal or plastic.

Figure 4:
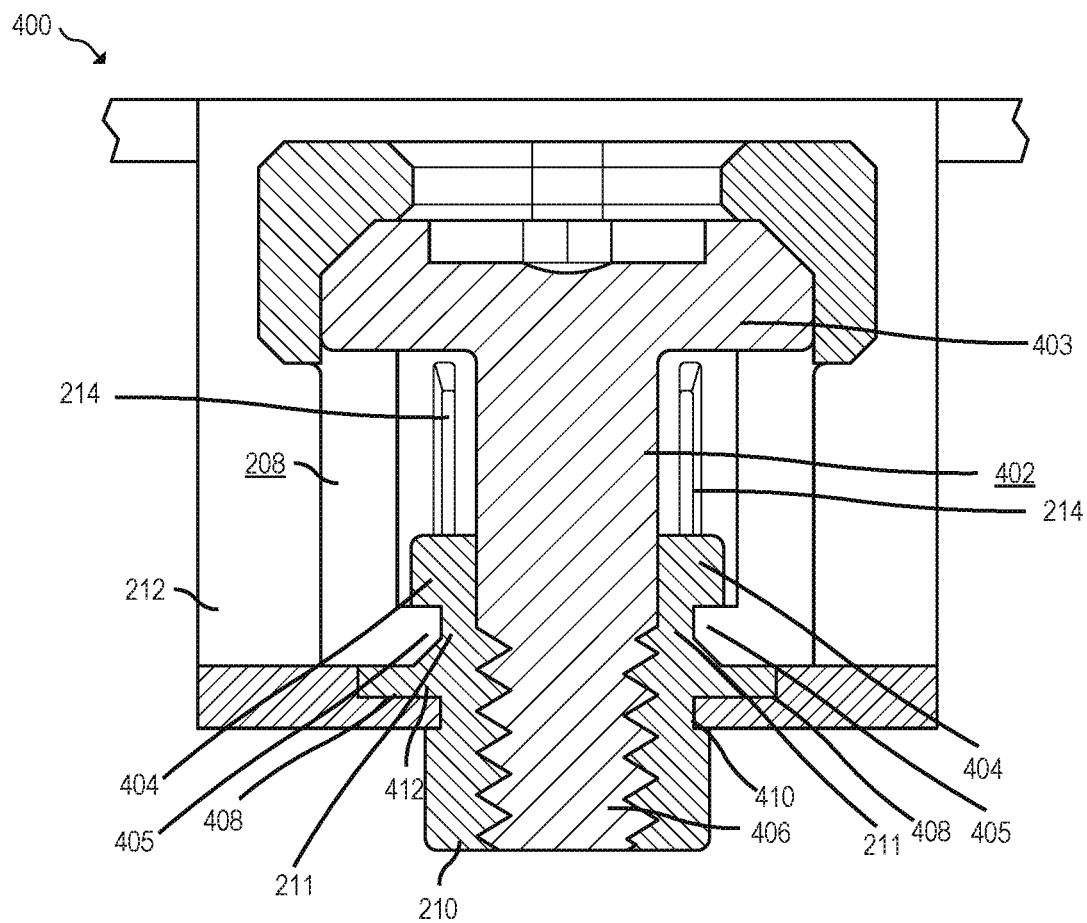
FIG. 4 is a schematic cut-away view of the captive screw, according to an example.

FIG. 4 is a schematic cut-away view of the captive screw, according to an example. As noted above, the sleeve 208 may include a sleeve retainer 405. In an example, the sleeve retainer 405 may be a hook or hooks, an L-shaped section, or some other protrusion. In a further example, the sleeve retainer 405 may correspond to the indentation 211, notch, or cut away of the press fit nut 210. For example, as the sleeve 208 is pressed onto the press fit nut 210, the sleeve retainer 405 may flex outwardly. As the sleeve retainer 405 flexes, the sleeve retainer 405 may pass or fit over the portion 404 of the press fit nut 210 above the indentation 211, notch, or cut away. Once the sleeve 208 or sleeve retainer 405 is fully pushed onto the press fit nut 210, the sleeve retainer 405 may flex back to the sleeve retainers 405 original position.

As noted above, the sleeve 208 may include friction ribs 214 along the inside of the sleeve 208. In an example, the screw 402 may be a custom screw. In such examples, the screw 402 (e.g., custom screw), in conjunction with the friction ribs 214 may allow for the captive screw 400 to function as a thumbscrew. In another example, the screw 402 may be a standard or "off-the-shelf" screw. In such an example, the friction ribs 214 may allow for the screw 402 to stay aligned with the aperture of the press fit nut 210. In other words, the friction ribs 214 may prevent the screw 402 from moving in any direction within the sleeve 208 (except for being tightened or loosened).

As noted above, the press fit nut 210 may fit into an aperture 410 of the device 212. The aperture 410 may be surrounded by a shallow cutout 408 or cut-away. The press fit nut 210 may also include a protrusion 412. In an example, the protrusion 412 may be situated or located underneath the indentation 211 or notch. The protrusion 412 may prevent the press fit nut 210 from falling through or being pushed fully through the aperture 410 of the device 212. In another example, protrusion 412 may extend further out than the rest of the press fit nut 210. In a further example, the protrusion 412 may be an integrated washer or similar to a washer in shape. In another example, the press fit nut 210 may be threaded or unthreaded. If the press fit nut 210 is unthreaded, then tightening the screw 402 may thread the press fit nut 210. In another example, if the press fit nut 210 is unthreaded, then the screw 402 may be a self-tapping screw.

FIG. 5 is a schematic exploded view of another captive screw, according to an example. As noted above, the captive screw 500 may include a screw 506. The screw 506 may be a standard or "off the shelf" screw. In another example, the sleeve 502 may include large gaps 514 at the top portion of the sleeve 502. In another example, small gaps 516 may be located at the bottom portion of the sleeve 502. In such examples, the small gaps 516 may be offset from the large gaps 514. In an example, the small gaps 516 may allow for sufficient flexibility to allow for the sleeve 502 (or sleeve retainer (not visible)) to fit over the press fit nut 510. In another example, the large gaps 514 may allow for sufficient flexibility of the sleeve 502 to allow for the screw 506 to be added through the top of the sleeve 502.

In another example, the captive screw 500 may be utilized by a device 512. In such examples, the captive screw 500 may be utilized to connect the device 512 to another device, PCB, or some other portion of a computing device. In another example, the press fit nut 510 may be threaded. In a further example, the threads may correspond to the threading 508 on the screw 506. In another example, the press fit nut 510 may not include threads. In such examples, tightening the screw 506 may thread the press fit nut 510. In another example, the screw 506 may be self-tapping.

As noted above, the sleeve 502 may be comprised of metal or plastic. In another example, the screw 506 may be comprised of metal or plastic. In another example, the press fit nut 510 may be comprised of metal or plastic.

Figure 6:
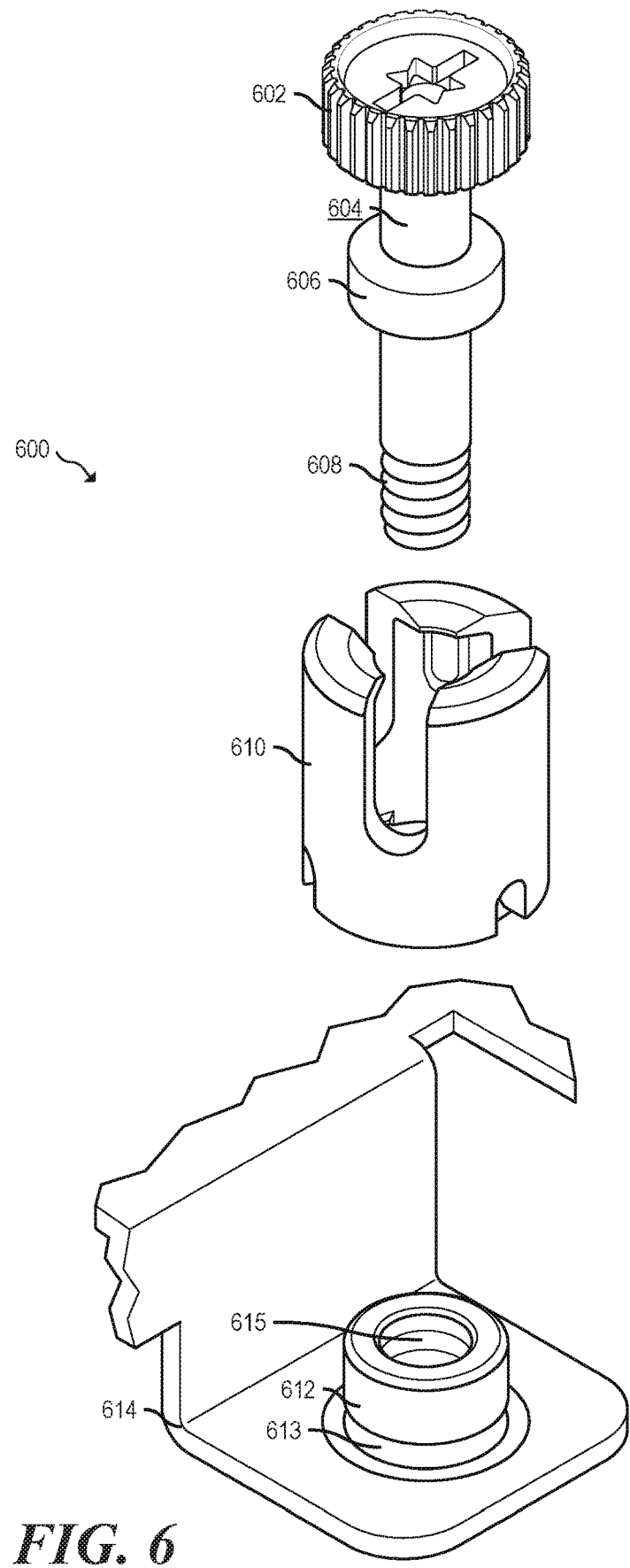
FIG. 6 is a schematic exploded view of a captive thumbscrew, according to an example.

FIG. 6 is a schematic exploded view of a captive thumbscrew, according to an example. As noted above, the captive screw 600 may include a screw. In an example, the screw may be a thumbscrew 604. In such examples, the thumbscrew 604 may include a knurled head 602. The thumbscrew 604 may also include a larger middle section 606. In other words, the middle section 606 may protrude out further, other than for the knurled head 602, than the top or bottom section of the thumbscrew 604. In such examples, the thumbscrew 604 may be tightened up to the middle section 606. In such examples, the sleeve 610 may fit over the middle section 606, including the bottom portions, of the thumbscrew 604. In such examples, the knurled head 602 may protrude from the top of the sleeve 610. Thus the knurled head 602 of the thumbscrew 604 may be accessible through the top of the sleeve 610. Further, the thumbscrew may be tightened due to the access through the top of the sleeve 610.

In an example, the thumbscrew 604 may be tightened or loosened by rotating or turning the knurled head 602 of the thumbscrew 604. In another example, the sleeve 610 may align the thumbscrew 604 with the aperture 615 of the press fit nut 612. As noted, the captive screw 600 may connect a device 614 to another device, computing device, or PCB.

Figure 7:
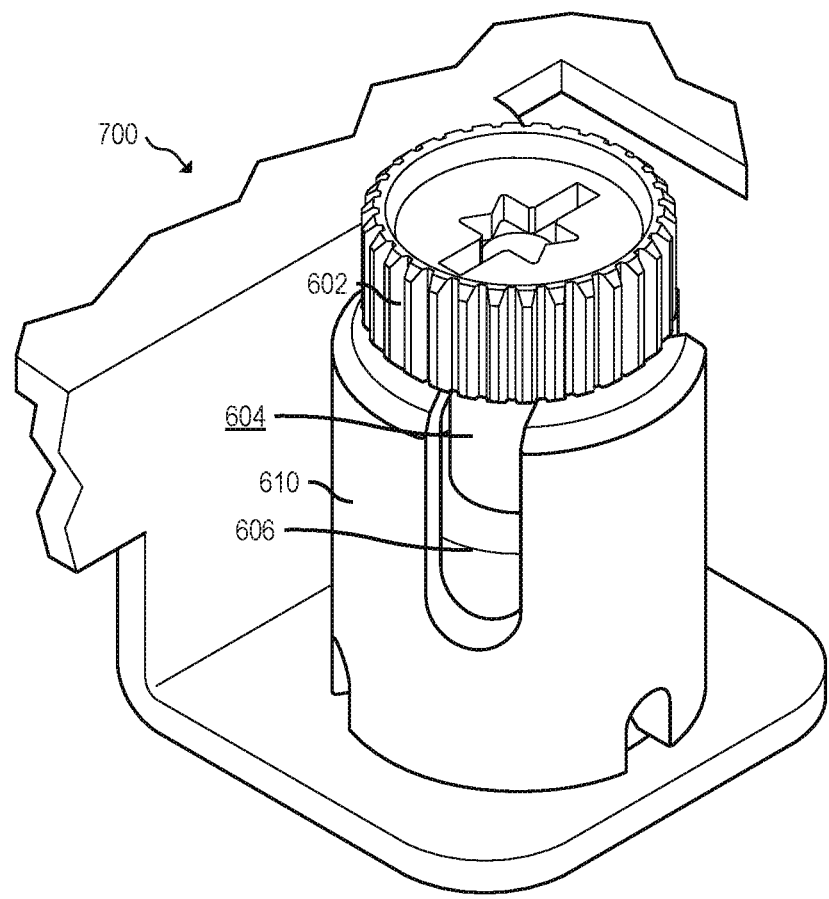
FIG. 7 is a schematic view of the captive thumbscrew, according to an example.

FIG. 7 is a schematic view of the captive thumbscrew, according to an example. In an example and as noted above, the captive thumbscrew 700 may include a thumbscrew 604. In another example, the thumbscrew 604 may include a knurled head 602. In another example, the knurled head 602 of the thumbscrew 604 may protrude from the top of the sleeve 610. Thus, a user may rotate the knurled head 602 clockwise to tighten the thumbscrew 604 or counter-clockwise to loosen the thumbscrew 604. As noted above, the middle section 606 may prevent the thumbscrew 604 from being fully removed from the sleeve 610 or from being over-tightened. In another example, the sleeve 610 may include a sleeve retainer. In such examples, the sleeve retainer may fit into the notch or indentation of the press fit nut.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims

What is claimed is:

1. A captive screw, comprising:
   a screw;
   a press fit nut, to connect to a device at an opening in the device and to accept the screw, including:
      a bottom portion, to be inserted into the opening to engage the device around the opening to connect the press fit nut to the device;
      a top portion; and
      a middle portion, wherein the middle portion is smaller in circumference than the top portion; and
   a sleeve including a sleeve retainer, wherein the sleeve fits over the screw and the top and middle portions of the press fit nut, and wherein the sleeve is configured to be attached to the press fit nut via the sleeve retainer engaging the middle portion;
   wherein, in an attached state of the sleeve to the press fit nut, the screw is movable relative to the sleeve in an axial direction in response to tightening of the screw.

2. The captive screw of claim 1, wherein the sleeve includes frictions ribs on an inside wall to hold the screw in alignment with the press fit nut while also allowing movement of the screw relative to the sleeve in the axial direction.

3. The captive screw of claim 1, wherein the sleeve is comprised of tabs and the sleeve retainer is located at bottom ends of the tabs.

4. The captive screw of claim 3,
   wherein each tab is separated from an adjacent one of the tabs by a gap
   wherein the screw comprises protrusions from a head of the screw and the protrusions of the screw extend into the gaps between the tabs.

5. The captive screw of claim 4, wherein each tab is flexible to allow the sleeve to fit over the top portion of the press fit nut to engage the middle portion and lock onto the press fit nut.

6. The captive screw of claim 1,
   wherein in a connected state of the press fit nut to the device, at least part of the bottom portion of the press fit nut is located on a first side of the device; and
   wherein in the connected state of the press fit nut to the device the top portion is located on a second side of the device, opposite from the first side.

7. The captive screw of claim 1,
   wherein the sleeve is configured to remain translationally stationary relative to the press fit nut in response to tightening of the screw.

8. The captive screw of claim 1,
   wherein the bottom portion of the press fit nut is to be inserted into the opening in a first direction from a first side of the device toward a second side of the device; and
   the press fit nut comprises a protrusion configured to engage the device on the first side thereof in a connected state of the press fit nut to the device to prevent the press fit nut from moving farther in the first direction through the opening than a predetermined position; and
   wherein the sleeve is configured to be attached to the press fit nut via the sleeve retainer engaging the middle portion such that a bottom edge of the sleeve abuts the protrusion.

9. The captive screw of claim 1,
   wherein the bottom portion of the press fit nut is to be inserted into the opening in a first direction from a first side of the device toward a second side of the device; and
   wherein the sleeve is configured to receive the screw via insertion of the screw in the first direction through an opening in a top portion of the sleeve, the top portion of the sleeve being configured to retain the screw in the sleeve after insertion of the screw through the opening.

10. A captive thumbscrew, comprising:
    a thumbscrew comprising a knurled head and a body;
    a press fit nut, to connect to a device at an opening in the device and to accept the thumbscrew, including:
       a bottom portion, to be inserted into the opening to engage the device around the opening to connect the press fit nut to the device;
       a top portion; and a middle portion, wherein the middle portion is smaller in circumference than the top portion; and a sleeve including a protrusion, wherein the sleeve fits over at least a portion of the body of the thumbscrew and the top and middle portions of the press fit nut, and wherein the sleeve is configured to be attached to the press fit nut by the protrusion of the sleeve being received into the middle portion of the press fit nut;

wherein, in an attached state of the sleeve to the press fit nut, the thumbscrew is movable relative to the sleeve in an axial direction in response to tightening of the thumbscrew.

11. The captive thumbscrew of claim 10, wherein the entirety of the knurled head of the thumbscrew, including a knurled portion, extends out of the top of the sleeve.

12. The captive thumbscrew of claim 10, wherein the top of the sleeve is knurled.

13. The captive screw of claim 10,
wherein the bottom portion of the press fit nut is to be inserted into the opening in a first direction from a first side of the device toward a second side of the device; and
wherein the sleeve is configured to receive the thumbscrew via insertion of the thumbscrew in the first direction through an opening in a top portion of the sleeve, the top portion of the sleeve being configured to retain the thumbscrew in the sleeve after insertion of the thumbscrew through the opening.

14. The captive screw of claim 10,
wherein the bottom portion of the press fit nut is to be inserted into the opening in a first direction from a first side of the device toward a second side of the device; and
the press fit nut comprises a protrusion configured to engage the device on the first side thereof in a connected state of the press fit nut to the device to prevent the press fit nut from moving farther in the first direction through the opening than a predetermined position; and
wherein the sleeve is configured to be attached to the press fit nut via the sleeve retainer engaging the middle portion such that a bottom edge of the sleeve abuts the protrusion.

15. A captive thumbscrew, comprising:
a thumbscrew, including a knurled head and a shaft extending from the knurled head, the shaft comprising a protruding section and threads, the protruding section having a larger diameter than the rest of the shaft;
a press fit nut, to connect to a device at an opening in the device and to accept the thumbscrew, including:
a bottom portion, to be inserted into the opening to engage the device around the opening to connect the press fit nut to the device;
a top portion; and
a middle portion, wherein the middle portion is smaller in circumference than the top portion; and
a sleeve including a protrusion, wherein the sleeve fits over the protruding section and threads of the thumbscrew and the top and middle portions of the press fit nut, and wherein the sleeve is configured to be attached to the press fit nut by the protrusion of the sleeve being received into the middle portion of the press fit nut;
wherein, in an attached state of the sleeve to the press fit nut, the thumbscrew is movable relative to the sleeve in an axial direction in response to tightening of the thumbscrew.

16. The captive thumbscrew of claim 15, wherein an inner surface of the sleeve includes friction ribs to keep the thumbscrew in alignment with the press fit nut, wherein the friction ribs are configured to allow movement of the thumbscrew relative to the sleeve in the axial direction.

17. The captive thumbscrew of claim 15, wherein the press fit nut is an unthreaded nut.

18. The captive thumbscrew of claim 15,
wherein the sleeve comprises a top portion with an opening through which a shaft of the thumbscrew extends such that the knurled head is positioned outside the sleeve and the protruding section is positioned inside the sleeve, with the top portion configured to retain the protruding section within the sleeve while allowing motion of the thumbscrew in the axial direction relative to the sleeve.

19. The captive thumbscrew of claim 18,
wherein the bottom portion of the press fit nut is to be inserted into the opening of the device in a first direction from a first side of the device toward a second side of the device; and
wherein the top portion of the sleeve is configured to allow the shaft of the thumbscrew, including the protruding section, to be inserted in the first direction through the opening in the top portion of the sleeve and to retain the protruding section in the sleeve after insertion of the protruding section through the opening.

20. The captive thumbscrew of claim 19,
wherein the press fit nut comprises a protrusion configured to engage the device on the second side thereof in a connected state of the press fit nut to the device to prevent the press fit nut from moving farther in the first direction through the opening than a predetermined position; and
wherein the sleeve is configured to be attached to the press fit nut via the sleeve retainer engaging the middle portion such that a bottom edge of the sleeve abuts sits flush with the protrusion.

* * * * *